(12) United States Patent
Kim et al.

(10) Patent No.: US 11,292,232 B2
(45) Date of Patent: Apr. 5, 2022

(54) GLASS WITH GLASS LAMINATION FILM

(71) Applicant: SKC Co., Ltd., Suwon-si (KR)

(72) Inventors: Hyejin Kim, Suwon-si (KR); Kyuhun Kim, Seoul (KR)

(73) Assignee: SKC Co., Ltd., Suwon-si (KR)

( * ) Notice: Subject to any disclaimer, the term of this patent is extended or adjusted under 35 U.S.C. 154(b) by 0 days.

(21) Appl. No.: 17/351,837

(22) Filed: Jun. 18, 2021

(65) Prior Publication Data

US 2021/0308992 A1    Oct. 7, 2021

Related U.S. Application Data

(63) Continuation of application No. PCT/KR2019/010297, filed on Aug. 13, 2019.

(30) Foreign Application Priority Data

Dec. 20, 2018  (KR) .................. 10-2018-0166395

(51) Int. Cl.
| | |
|---|---|
| *B32B 27/22* | (2006.01) |
| *B32B 27/30* | (2006.01) |
| *B32B 17/10* | (2006.01) |
| *C08J 5/18* | (2006.01) |
| *C08K 3/08* | (2006.01) |
| *C08K 5/00* | (2006.01) |
| *C08K 13/02* | (2006.01) |
| *C08L 29/14* | (2006.01) |

(52) U.S. Cl.
CPC ........ *B32B 17/10761* (2013.01); *B32B 17/10* (2013.01); *B32B 17/10036* (2013.01); *B32B 17/10605* (2013.01); *B32B 27/22* (2013.01); *B32B 27/30* (2013.01); *C08J 5/18* (2013.01); *C08K 3/08* (2013.01); *C08K 5/0016* (2013.01); *C08K 13/02* (2013.01); *C08L 29/14* (2013.01); *B32B 2250/03* (2013.01); *B32B 2250/40* (2013.01); *B32B 2307/40* (2013.01); *B32B 2307/7246* (2013.01); *B32B 2315/08* (2013.01); *B32B 2329/06* (2013.01); *B32B 2419/00* (2013.01); *B32B 2605/006* (2013.01); *C08J 2329/14* (2013.01)

(58) Field of Classification Search
None
See application file for complete search history.

(56) References Cited

U.S. PATENT DOCUMENTS

2021/0291495 A1* 9/2021 Kim .................. B29C 71/0081

FOREIGN PATENT DOCUMENTS

| CN | 102822250 A | 12/2012 |
|---|---|---|
| CN | 104411652 A | 3/2015 |
| CN | 108349798 A | 7/2018 |
| JP | 10-139496 A | 5/1998 |
| JP | 2003-261362 A | 9/2003 |
| JP | 2004-067427 A | 3/2004 |
| JP | 2005-289038 A | 10/2005 |
| JP | 2011-026184 A | 2/2011 |
| JP | 2013-006727 A | 1/2013 |
| JP | 2015-516934 A | 6/2015 |
| JP | 2015-189652 A | 11/2015 |
| KR | 10-2013-0049052 A | 5/2013 |
| KR | 10-2013-0051925 A | 5/2013 |
| KR | 10-2017-0132769 A | 4/2017 |
| KR | 10-2017-0132769 A | 12/2017 |
| KR | 10-2018-0052593 A | 5/2018 |
| KR | 10-2018-0055830 A | 5/2018 |
| TW | 201329009 A1 | 7/2013 |

OTHER PUBLICATIONS

Korean Decision to Grant a Patent dated Sep. 7, 2020 in counterpart Korean Patent Application No. 10-2018-0166395 (1 page in English, 5 pages in Korean).

Korean Office Action dated Jun. 29, 2020 in counterpart Korean Patent Application No. 10-2018-0166395 (6 pages in English, 5 pages in Korean).

Chinese Submission of Opinions dated Oct. 25, 2021 in corresponding Chinese Patent Application No. 201980078974.2. (7 pages in Chinese).

* cited by examiner

*Primary Examiner* — Sheeba Ahmed
(74) *Attorney, Agent, or Firm* — NSIP Law

(57) ABSTRACT

A film for glass lamination includes a metal salt or a metal ion. A first absolute value in a gradient of concentration of metal ions within a depth of 6 to 45 nm from a surface of the film is greater than a second absolute value in the gradient of the concentration of the metal ions within a depth of 86 to 125 nm from the surface. A first average value of the concentration of the metal ions within the depth of 6 to 45 nm is 2.5 times or more than a second average value of the concentration of the metal ions within the depth of 86 to 125 nm.

13 Claims, 4 Drawing Sheets

FIG. 3
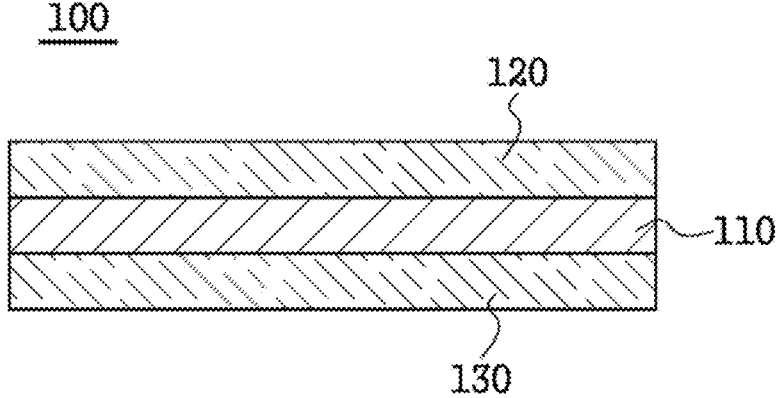
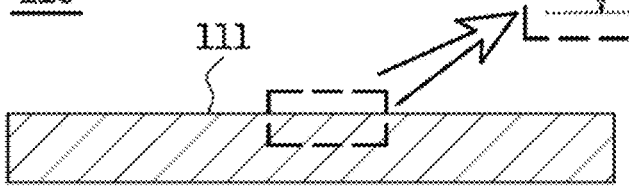
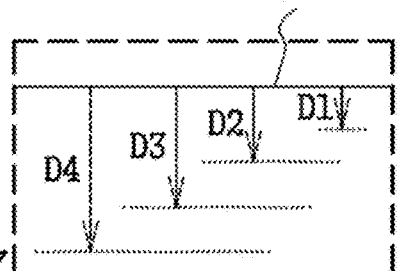

GLASS WITH GLASS LAMINATION FILM

CROSS-REFERENCE TO RELATED APPLICATIONS

Pursuant to 35 USC 120 and 365(c), this application is a continuation of International Application No. PCT/KR2019/010297 filed on Aug. 13, 2019, and claims the benefit under 35 USC 119(a) of Korean Application No. 10-2018-0166395 filed on Dec. 20, 2018, in the Korean Intellectual Property Office, the entire disclosures of which are incorporated herein by reference for all purposes.

BACKGROUND

1. Field

The present disclosure relates to a glass with glass lamination film.

2. Description of Related Art

In general, laminated glass (e.g., tempered glass and safety glass) consists of a pair of glass panels and a synthetic resin film inserted therebetween. Laminated glass is widely used in road vehicles, such as automobiles and buildings, due to its enhanced safety because its fragments are not scattered even when the glass is broken. A polyvinyl acetal resin having a high affinity for inorganic materials is often utilized in the film applied to such laminated glass.

Laminated glass has basic properties required for penetration resistance and anti-scattering of glass fragments, but moisture resistance of the laminated glass may be degraded. In this case, an interlayer of the laminated glass may generate a whitening phenomenon in the periphery when in direct contact with air in a humid atmosphere. An additive for adjusting adhesive strength between a film and a glass may prevent such whitening phenomena or the like.

Japanese Patent Publication No. 1998-139496 (Application No. 1996-290261) discloses a film, the whitening of which is not generated as an interlayer for a laminated glass containing a polyvinyl butyral, a plasticizer, a carboxyl metal salt, and a denatured silicon oil. However, the film may lower compatibility with a polyvinyl butyral resin due to using a denatured silicon oil having a low polarity so that the haze value of the final film may be increased. In addition, the functional group of glass to react with a hydroxyl group of a polyvinyl butyral resin is disturbed by the denatured silicon oil to lower adhesion, thereby degrading penetration resistance and impact resistance.

Additionally, if an additive is applied in an excessive amount for an adhesion regulation effect, moisture resistance is lowered instead, and the yellow index may be increased in long-term durability evaluation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a film for glass lamination includes a metal salt or a metal ion. A first absolute value in a gradient of concentration of metal ions within a depth of 6 to 45 nm from a surface of the film is greater than a second absolute value in the gradient of the concentration of the metal ions within a depth of 86 to 125 nm from the surface. A first average value of the concentration of the metal ions within the depth of 6 to 45 nm is 2.5 times or more than a second average value of the concentration of the metal ions within the depth of 86 to 125 nm.

A third absolute value in the gradient of the concentration of the metal ions within a depth of 46 to 85 nm from the surface of the film is greater than the second absolute value.

A third average value of the concentration of the metal ions within a depth of 46 to 85 nm from the surface of the film may be greater than the second average value.

A yellow index variation value of the film is 2.5 or less during, before, and after being kept in an isothermal-isohumidity chamber of 65° C. and 95% rh for two weeks.

In another general aspect, a film for glass lamination includes a polyvinyl acetal resin, a plasticizer, and a metal salt or a metal ion. A first average value of concentration of metal ions within a depth of 6 to 45 nm from a surface of the film is 2.5 times or more than a second average value of the concentration of the metal ions within a depth of 86 to 125 nm from the surface. The film satisfy Equation 1:

$$\left|\frac{M2-M1}{D2-D1}\right| > \left|\frac{M4-M3}{D4-D3}\right|$$

where M1 is an amount of metal ions at a first depth (D1) from the surface, M2 is an amount of metal ions at a second depth (D2), M3 is an amount of metal ions at a third depth (D3), and M4 is an amount of metal ions at a fourth depth (D4), and the D1 and D2 are respectively 60 nm or less, and the D3 and D4 are respectively 80 nm or more.

The D1 may be 0.1 nm to 15 nm, the D2 may be 40 nm to 55 nm, the D3 may be 80 nm to 95 nm, and the D4 may be 135 nm to 150 nm.

A difference between the D2 and the D1 may correspond to a difference between the D4 and the D3.

D1 may be 5 nm, the D2 may be 55 nm, the D3 is 90 nm, and the D4 may be 140 nm.

The M1 may be three times or more of the M3.

In another general aspect, a laminated glass includes a first glass substrate, a second glass substrate disposed opposite to the first glass substrate, and a glass lamination film interposed between, and bonding, the first glass substrate and the second glass substrate. The glass lamination film may include a polyvinyl acetal resin, a plasticizer, and a metal salt or a metal ion. A first average value of concentration of metal ions within a depth of 6 to 45 nm from a surface of the glass lamination film is 2.5 times or more than a second average value of the concentration of the metal ions within a depth of 86 to 125 nm from the surface. The glass lamination film satisfies Equation 1:

$$\left|\frac{M2-M1}{D2-D1}\right| > \left|\frac{M4-M3}{D4-D3}\right|$$

where M1 is an amount of metal ions at a first depth (D1) from the surface, M2 is an amount of metal ions at a second depth (D2), M3 is an amount of metal ions at a third depth (D3), and M4 is an amount of metal ions at a fourth depth (D4), and the D1 and D2 are respectively 60 nm or less, and the D3 and D4 are respectively 80 nm or more.

Other features and aspects will be apparent from the following detailed description, the drawings, and the claims.

(a) of FIG. 3 is a conceptual view illustrating a cross-section of an example of a laminated glass according to one embodiment of the present disclosure.

(b) of FIG. 3 is a conceptual view for illustrating an example of a first depth to a fourth depth of Equation 1.

Figure 4:
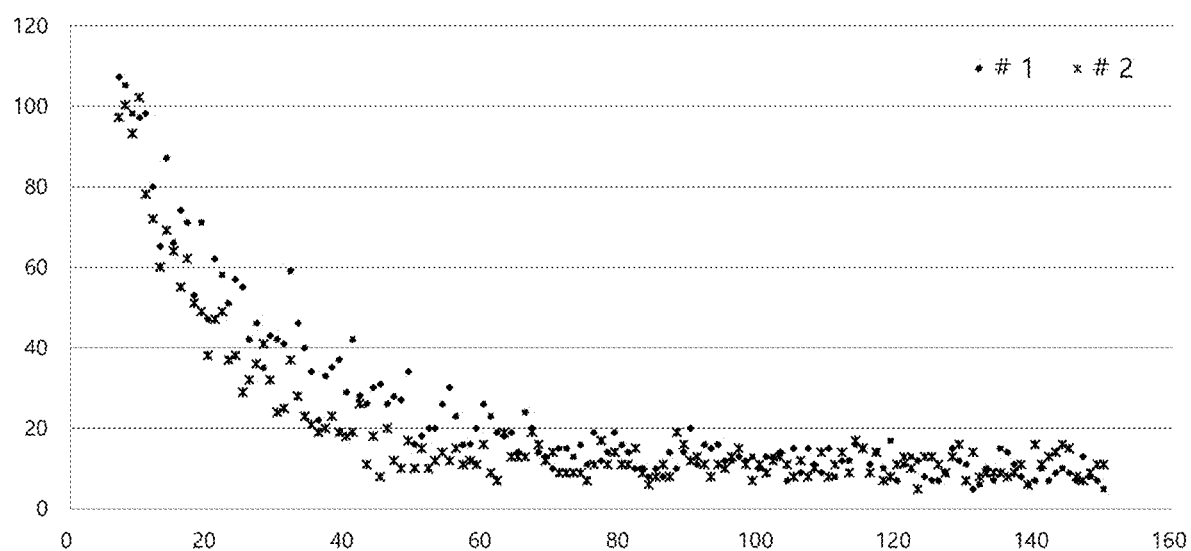

FIG. 4 is a graph for showing the result of evaluating surface ion density measured in embodiments of the present disclosure (#1 refers to Example 1, #2 refers to Example 2, the horizontal axis refers to depth (nm), and the vertical axis refers to intensity (counts)).

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Throughout the present disclosure, the phrase "combination(s) thereof" included in a Markush-type expression denotes one or more mixtures or combinations selected from the group consisting of components stated in the Markush-type expression, that is, denotes that one or more components selected from the group consisting of the components are included.

In this application, the term "X-based" may mean that a compound includes a compound corresponding to X, or a derivative of X.

In this application, "B being placed on A" means that B is placed in direct contact with A or placed over A with another layer or structure interposed therebetween and thus should not be interpreted as being limited to B being placed in direct contact with A, unless the description clearly dictates.

The inventors recognized that when a metal salt compound is applied in a comparatively large amount, a yellowing phenomenon easily occurs. In researching a solution to the problem, the inventor developed a film for glass lamination that can regulate adhesive strength even in a small amount.

The present disclosure manufactures a film to have a density gradient in which a more amount of metal salt ions are disposed at the surface, so that can manufacture a film for glass lamination and the like which obtain a sufficient adhesion regulation effect even though decreasing an applied amount of a metal salt compound to the same or below and having a sufficiently improved moisture resistance and/or durability.

The film for glass lamination and a laminated glass including the same can provide a film for glass lamination and a laminated glass which are easy to efficiently regulate adhesion strength and improved in moisture sensitivity. Additionally, a film for glass lamination having an excellent adhesion regulation effect even though applied with a metal salt adhesion regulator in a comparatively small amount, and not generating degradation of moisture resistance or long-term durability can be provided.

Figure 1:
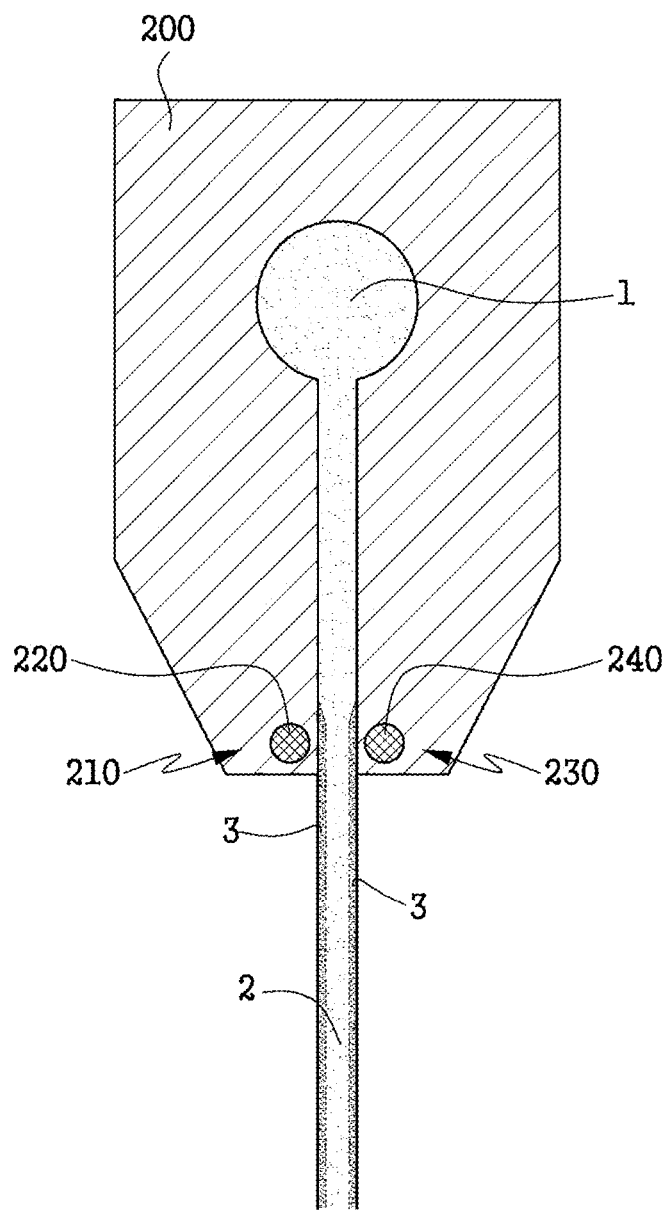
FIG. 1 is a schematic view illustrating an example of a device structure of a die lip for regulating an ion density of a surface of a film applied in embodiments of the present disclosure.
Figure 2:
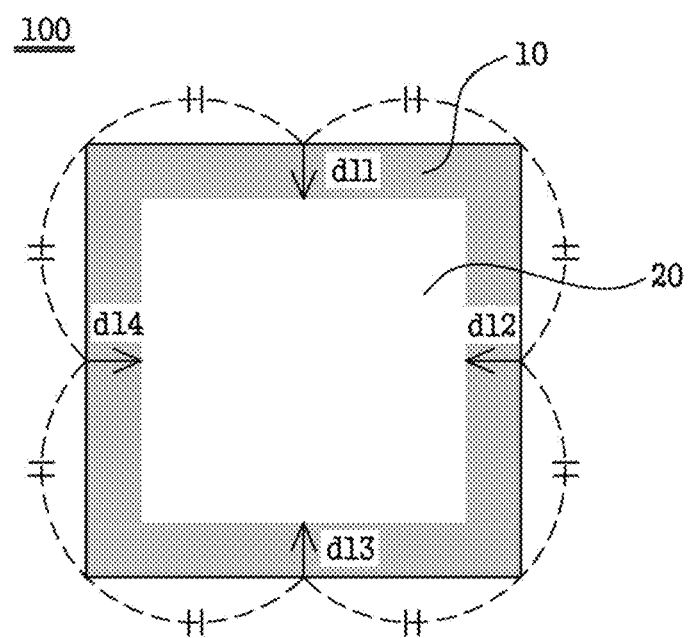
FIG. 2 is a drawing illustrating an example of a method of measuring a whitening occurrence distance measured in embodiments of the present disclosure.

FIG. 1 is a schematic view for illustrating a device structure of a die lip for regulating an ion density of a surface of a film applied in embodiments of the present disclosure. FIG. 2 is a drawing for illustrating a method of measuring a whitening occurrence distance measured in embodiments of the present disclosure. (a) of FIG. 3 is a conceptual view for illustrating a cross-section of a laminated glass according to one embodiment of the present disclosure. (b) of FIG. 3 is a conceptual view illustrating a first depth to a fourth depth of Equation 1. Referring to FIGS. 1 to 3, the present disclosure will be described in further detail.

In a general aspect, a film for glass lamination 110 comprises a metal salt or a metal ion and has a greater absolute value in a gradient of concentration of metal ions within a depth of 6 to 45 nm from the surface rather than a gradient of concentration of metal ions within a depth of 86 to 125 nm from the surface.

A metal salt may exist inside the film in the form of a metal ion and serves as a regulator of adhesive strength between a polyvinyl acetal resin and a bonded glass.

In detail, the film for glass lamination 110 may comprise a polyvinyl acetal resin, a plasticizer, and a metal salt. The metal salt compound may be comprised in the film in the form of metal salt compound itself or a form of metal salt ion by being ionized.

The metal salt compound may be applied to obtain an adhesion regulation effect with a light transmitter like glass. In detail, a metal salt of carboxyl acid having two to sixteen carbon atoms may be applied. In addition, a metal salt of a divalent metal with two to twelve carbon atoms or a metal salt of a monovalent metal with two to six carbon atoms may be applied.

The metal ion comprised in the metal salt compound may be any one selected from the group consisting of sodium (Na) monovalent cation, magnesium (Mg) divalent cation, and potassium (K) monovalent cation.

As for the metal salt compound, magnesium (Mg) acetate or potassium (K) acetate may be applied, but the present application is not limited thereto.

The metal salt compound may be applied to the composition in an intact metal salt compound state or an ionized state dissolved in a solvent and serve as an adhesion regulator. When the metal salt compound is applied in a state of solution, it is possible to allow dispersion and moving of the metal salt compound or ions derived from the metal salt compound to be easier inside a manufactured film or an adhesion layer.

In particular, the present disclosure distributes a metal salt or metal ions having an adhesion regulation effect to form a comparatively high density in a place near to a surface of a film, thereby inducing an excellent regulation effect against an applied amount.

The present disclosure describes a method of evaluating concentration of metal ions measured by dividing sections in a unit of 40 nm from the surface as a more effective method for evaluating the concentration distribution of metal ions inside a film, and then evaluate dispersion of metal ions inside a film with the average concentration of metal ions depending on the section and gradient value of metal ions distributed in the section.

In detail, the film may have an absolute value in a gradient of concentration of metal ions within a depth of 6 to 45 nm from the surface greater than a gradient of concentration of metal ions within a depth of 86 to 125 nm from the surface.

In detail, the film may have an absolute value in a gradient of concentration of metal ions within a depth of 46 to 85 nm from the surface greater than a gradient of concentration of metal ions within a depth of 86 to 125 nm from the surface.

In detail, the film may have a greater absolute value in a gradient of concentration of metal ions within a depth of 6 to 45 nm from the surface rather than a gradient of concentration of metal ions within a depth of 46 to 85 nm from the surface.

In further detail, the film may have a gradient value of a concentration of metal ions within a depth of 6 to 45 nm from the surface (Section 1) which is 1.2 times or more, two times or more, or three times or more based on a gradient of concentration of metal ions within a depth of 26 to 85 nm from the surface (Section 2).

When the gradient of the concentration of metal ions in Section 1 has a larger value like the above compared to the gradient of the concentration of metal ions in Section 2, it may mean that the distribution of metal ions in Section 1 is relatively high compared to the Section 2 and this shows that the uneven distribution of an adhesion regulator described above inside a film allows the film to obtain an excellent adhesion regulation effect even though a metal salt is applied in a less amount.

In detail, an average value of the concentration of metal ions within a depth of 6 to 45 nm from the surface may be greater than an average value of the concentration of metal ions within a depth of 86 to 125 nm from the surface.

In detail, an average value of the concentration of metal ions within a depth of 46 to 85 nm from the surface may be greater than an average value of the concentration of metal ions within a depth of 86 to 125 nm from the surface.

In detail, an average value of the concentration of metal ions within a depth of 6 to 85 nm from the surface may be greater than an average value of the concentration of metal ions within a depth of 86 to 125 nm from the surface.

In further detail, the film may have an average value of the concentration of metal ions within a depth of 6 to 45 nm from the surface (Section 1), which is 1.2 times or more, 1.8 times or more, or 2.5 times or more based on an average value of the concentration of metal ions within a depth of 86 to 125 nm from the surface (Section 3).

When the average value of the concentration of metal ions in Section 1 has a larger value like the above compared to the average value of the concentration of metal ions in Section 3, it means that the distribution of metal ions in Section 1 is relatively high compared to the Section 3. And this means that the distribution of an adhesion regulator described above is uneven inside a film so that the film can obtain an excellent adhesion regulation effect though applied with a metal salt in a less amount.

In further detail, the film may have an average value of the concentration of metal ions within a depth of 6 to 45 nm from the surface (Section 1), which is 1.2 times or more, 1.8 times or more, or 2.5 times or more based on an average value of the concentration of metal ions within a depth of 46 to 85 nm from the surface (Section 2).

When the average value of the concentration of metal ions in Section 1 has a larger value like the above compared to the average value of the concentration of metal ions in Section 2, it may mean that the distribution of metal ions in Section 1 is relatively high compared to the Section 2 and this shows that the uneven distribution of an adhesion regulator described above inside a film allows the film to obtain an excellent adhesion regulation effect even though a metal salt is applied a less amount.

The metal salt compound may be comprised in an amount of less than 1.0 wt %, less than 0.5 wt %, or 0.35 wt % or less based on the entire molten resin. Also, the metal salt compound may be comprised in an amount of 0.01 to 0.5 wt %, 0.01 to 0.35 wt %, 0.01 to 0.25 wt %, or 0.01 to 0.2 wt % based on the entire molten resin. The molten resin may be formed into a monolayer film, or a surface layer of a multilayer film.

The amount of metal ions derived from the metal salt compound may be 150 ppm or less, or 100 ppm or less based on the entire molten resin. Also, the amount of metal ions derived from the metal salt compound may be 1 to 70 ppm, 1 to 50 ppm, or 1 to 35 ppm based on the entire molten resin. Even though the film for glass lamination contains the metal salt compound or the metal salt ions in a considerably low amount, placing more amounts of the metal ions on the surface requiring an adhesion regulation effect allows for adequate adhesion regulation effect. Here, ppm is calculated based on weight.

The metal salt compound may be comprised in an amount described above based on the entire composition to be manufactured into a monolayer film for glass lamination. Also, the metal salt compound may be comprised in an amount described above based on the entire composition to be manufactured into a multilayer film for glass lamination. In the case of multilayer, the composition comprising the metal salt compound may be comprised in a surface layer (adhesion layer).

The polyvinyl acetal may be a polyvinyl acetal obtained by acetalization of a polyvinyl alcohol having a polymerization degree of 1,600 to 3,000 using an aldehyde, or a polyvinyl acetal obtained by acetalization of a polyvinyl alcohol having a polymerization degree of 1,700 to 2,500 using an aldehyde. When such a polyvinyl acetal is applied, mechanical properties like penetration resistance can be sufficiently enhanced.

The polyvinyl acetal may be synthesized from polyvinyl alcohol and an aldehyde, and the aldehyde is not limited in type. In detail, the aldehyde may be any one selected from the group consisting of n-butyl aldehyde, isobutyl aldehyde, n-valer aldehyde, 2-ethyl butyl aldehyde, n-hexyl aldehyde, and a blend resin thereof. When n-butyl aldehyde is applied as the aldehyde, a manufactured polyvinyl acetal resin may have a refractive index having a low difference with the refractive index of glass and excellent adhesive strength with glass and the like.

The plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibu oxyethoxyethyl adipate (DBEA), butyl carbitol adipate (DBEEA), dibutyl sebacate (DBS), bis 2-hexyl adipate (DHA), and a mixture thereof, and more specifically, triethylene glycol bis 2-ethylhexanoate (3G8) may be applied as the plasticizer.

The film may further comprise an additive applied to a film for glass lamination.

As the additive, a UV stabilizer (UV absorber) may be applied together for enhancing a UV blocking effect, and a benzotriazole-based compound may be applied as such a UV stabilizer.

The benzotriazole-based compound may vary the bond structure thereof generated from the interaction between a hydroxyl group inside the molecule and nitrogen comprised in a triazole ring near the hydroxyl group. In this time, if a metal ion gets involved, the effect as a UV stabilizer of the benzotriazole-based compound may be degraded. Also, the benzotriazole-based compound may form a chelate ring by a coordinate covalent bond with a polyvalent metal ion. The benzotriazole-based compound having a chelate ring formed therein in this manner may not sufficiently function as a UV stabilizer, thereby weakening the durability of the entire film.

As the UV stabilizer, any one applied as a UV stabilizer may be applied without limit, and a UV stabilizer comprising a benzotriazole-based compound is also applicable. In detail Chemisorb 12, Chemisorb 79, Chemisorb 74, or Chemisorb 102 available from CHEMIPRO KASEI KAISHA, LTD may be used, or Tinuvin 328, Tinuvin 329, or Tinuvin 326 available from BASF SE may be used.

The present disclosure allows a benzotriazole-based compound to have an excellent adhesion regulation effect even in a small amount, to do a function as a UV stabilizer sufficiently and enhance the durability of a film for glass lamination itself.

The metal salt compound may be comprised in an amount of 16 parts by weight or less, 12 parts by weight or less, or 1 to 10 parts by weight based on the benzotriazole-based compound of 100 parts by weight. When the metal salt compound comprises less than 1 part by weight based on the benzotriazole-based compound of 100 parts by weight, an adhesion regulation effect obtained by adding the metal salt compound may not be sufficient. When the metal salt compound comprises more than 16 parts by weight, moisture resistance may be degraded instead.

The composition may further comprise an additive selected from the group consisting of an antioxidant, a heat stabilizer, an IR absorber, and a combination thereof as required. The additive may be comprised in at least one layer among respective layers in the above or may be comprised in the entire film.

Long-term durability, such as thermal stability and light stability, and the anti-scattering performance of the film may be more improved by comprising the additive to the composition.

As the antioxidant, a hindered amine-based antioxidant or a hindered phenol-based antioxidant may be used. Specifically, in the process of manufacturing polyvinyl butyral (PVB), which needs a processing temperature of 150° C. or higher, a hindered phenol-based antioxidant is more preferable. The hindered phenol-based antioxidant, for example, may be Irganox 1976, 1010, or so on available from BASF SE.

As the heat stabilizer, a phosphite-based heat stabilizer may be used, considering suitability with an antioxidant. The heat stabilizer, for example, may be Irgafos 168, available from BASF SE. As the IR absorber, ITO, ATO, or AZO may be used, but the present application is not limited thereto.

The film for glass lamination 110 has a whitening occurrence distance of 5 mm or less measured by keeping a laminated glass 100 comprising the film for glass lamination for two weeks in an isothermal-iso humidity chamber at 65° C. and 95% rh (Relative Humidity), and this means it has an excellent moisture resistance.

The film for glass lamination 110 may have a yellow index variation of 2.5 or less between before and after being kept for two weeks in an isothermal-iso humidity chamber at 65° C. and 95% rh and taken out, and it means it has excellent durability.

The pummel adhesion grade of a laminated glass 100 comprising the film for glass lamination 110 may be grade 3 or 4. This means that the laminated glass 100 has a pummel adhesion suitable to be applied as safety glass. Particularly, the laminated glass has an excellent utilization as a windshield for vehicles.

The thickness of the film for glass lamination 110 may be 0.4 mm or more, in detail, 0.4 to 1.6 mm, 0.5 to 1.2 mm, or 0.6 to 0.9 mm. When manufacturing the film to have such a thickness, it is possible to provide a film with excellent impact resistance and penetration resistance with being thin and light.

The film for glass lamination 110 may be a monolayer structure, a multilayer structure with two or more layers, a multilayer structure with three or more layers, or a multilayer structure with five or more layers. Particularly, when the film for glass lamination 110 is a multilayer structure with three or more layers, the layer placed inside, excluding the surface layers of both sides, may be a function layer. For example, the function layer may be a sound-insulating layer for giving a sound-insulating function to the film for glass lamination, or a wedge layer allowing the film to have a function of head-up display.

When the film for glass lamination 110 has a structure with three or more layers, it is more efficient that characteristics on a metal salt or metal ions described above is applied to surface layers.

A film for glass lamination 100, according to another embodiment of the present disclosure, comprises a polyvinyl acetal resin, a plasticizer, and a metal salt or a metal ion and satisfies below Equation 1.

$$\left|\frac{M2-M1}{D2-D1}\right| > \left|\frac{M4-M3}{D4-D3}\right| \quad \text{[Equation 1]}$$

In Equation 1, the M1 is an amount of metal ions at a first depth (D1) based on the surface 111 of the film for glass lamination, the M2 is an amount of metal ions at a second depth (D2), the M3 is an amount of metal ions at a third depth (D3), and the M4 is an amount of metal ions at a fourth depth (D4). The D1 and D2 are respectively 60 nm or less, and the D3 and D4 are respectively 80 nm or more.

The first depth and the second depth may be the same value or different values. For example, the first depth and the second depth may have a difference of 3 nm or more, or 5 nm or more.

The third depth and the fourth depth may be the same value or different values. For example, the third depth and the fourth depth may have a difference of 3 nm or more, or 5 nm or more.

In (a) and (b) of FIG. 3, for a more detailed description, the first depth (D1), the second depth (D2), the third depth (D30), and the fourth depth (D4) respectively refers to certain depths from a surface 111 of the film for glass lamination. Here, a surface of the film for glass lamination may be an adhesion surface of the film for glass lamination 110, which directly contacts with a glass substrate or the like to be bonded to the glass substrate or the like.

In one embodiment, the D1 may belong to 0.1 nm to 15 nm, the D2 may belong to 40 nm to 55 nm, the D3 may belong to 80 nm to 95 nm, and the D4 may belong to 135 nm to 150 nm.

In one embodiment, the difference between D2 and D1 may correspond to the difference between D4 and D3.

The difference between the first depth and the second depth may substantially be the same as the difference between the third depth and the fourth depth.

In one embodiment, the D1 may be 5 nm, the D2 may be 55 nm, the D3 may be 90 nm, and the D4 may be 140 nm.

Also, in one embodiment, the M1 may be three times or more, 3.5 times or more, eight times or less, or six times or less of the M2.

A method of manufacturing the film for glass lamination 110 will be described.

The method of manufacture comprises a melting operation and a shaping operation. A method of applying electric force to the molten resin by the shaping unit is applied in the shaping operation to manufacture a film for glass lamination with the characteristics described above.

The melting operation prepares a molten resin by melting a composition comprising a polyvinyl acetal resin and an additive.

The additive may comprise a metal salt.

The melting operation may apply a resin melting method generally applied during film manufacture, for example, a twin-screw extruder.

Descriptions on the composition comprising a polyvinyl acetal resin and an additive and a metal salt comprised in the additive are overlapped with the above description, and thus further description is omitted.

The shaping operation is for forming a film for glass lamination 110 by discharging the molten resin and shaping it into a film form by a shaping unit.

As for the shaping unit, any one for manufacturing a film form with controlling the thickness can be applied, and when manufacturing a monolayer film, a molten resin can be manufactured into a film form by being placed in an extruder (ex. twin-screw extruder), melted and discharged with having a controlled thickness by a T-die, or when manufacturing a multilayer film, a molten resin can be shaped into a film form in a T-die after respectively being melted and discharged in an extruder to be laminated by a laminating device such as a feed block or a multi manifold (co-extrusion method).

The shaping unit may comprise a T-die 200 placed in one end thereof.

In the shaping operation, electric force may be applied to the molten resin (1) by the shaping unit.

A voltage of 10 kV or less may be applied to the shaping unit in the shaping operation.

In the shaping operation, attraction to the shaping unit may be applied to the metal ions by the electric force.

A case of the shaping operation in which a T-die is placed in the shaping unit will be described, for example. A T-die 200 is placed in one end of the shaping unit, the T-die 200 has an inlet (not shown) where a molten resin composition (1) flows into, an outlet where the molten resin composition is discharged, and die lips 210 and 230 are placed at both sides of a part for discharging the molten resin composition in the inlet. In the present disclosure, voltage applying parts 220 and 240 are respectively placed in the die lips 210 and 230 of both sides. The voltage applying parts 220 and 240, for example, are voltage applying devices like a tungsten wire, which can give an applied voltage to the die lips b 210 and 230. The voltage applying parts 220 and 240 are electrically connected to an external power supply device (not shown).

The voltage applying parts b 220 and 240 regulate the voltage of the die lips and allow the molten resin (1) to be a charged molten resin (2). The charged molten resin (2) comprises a high-density area (3) which is formed because metal ions that had been comprised in the molten resin (1) are moved to a surface. The high-density area (3) refers to an area in which a surface ion density described below is higher than the average ion density of a film. The charged molten resin having a high-density area in the surface subsequently forms a film for glass lamination having a metal ion density gradient of U type in a thickness direction.

In detail, a voltage applied to the shaping unit may be 10 kV or less, 1 to 10 kV, 1.5 to 8 kV, or 2.5 to 6 kV. When the voltage is too low, the force for pulling a metal ion, which is a cation to a surface of a film for glass lamination, is weak, and a sufficient density gradient may not be induced. On the other hand, when a too strong voltage is applied, deterioration may occur in a polymer film. Properties of the film may be degraded instead because the properties of the film, such as optical properties and long-term durability, are affected.

In detail, when the molten resin contains a metal salt in an amount of 0.1 to 0.3 wt %, a voltage applied by the voltage applying part may be 4 to 6 kV, and when the molten resin contains a metal salt in an amount of more than 0.3 wt % and 0.8 wt % or less, a voltage may be applied in 3 to 4 kV.

The voltage may be applied to pull the metal ion, which is a cation, in detail, may be applied to have a negative charge.

Differently from this, electric force may be applied to the molten resin by static electricity. For example, when the molten resin is extruded, static electricity generated from friction may remain in the shaping unit so that electric force may be applied to the molten resin by the shaping unit. For example, the shaping unit may not be grounded to prevent the static electricity remaining in the shaping unit from being easily discharged. In addition, though the shaping unit is grounded, the amount of discharged static electricity may be adjusted to allow some static electricity to remain because the ground wire resistance connected with the shaping unit is high.

The charged molten resin (2) shaped in the shaping operation is discharged at a rate of 5 to 15 m per minute to be formed into a film, and the rate may be 5 to 15 m per minute, or 7 to 13 m per minute.

After the shaping operation, processes generally applied to the manufacture of a film for glass lamination may be similarly applied; thus, further description is omitted.

The method of manufacture may apply a density of metal ions differently depending on the thickness from the film's surface for glass lamination to its center. Thus, a film for glass lamination having a density gradient in which distribution of a metal salt compound, particularly the distribution of metal cations, is concentrated in a surface, even though applying a metal salt compound as an adhesion regulator in the same amount may be provided. Thus, even though an additive (materials derived from this additive are comprised) having an adhesion regulation effect acts sufficiently in a surface of the film for glass lamination interacting with a glass to be laminated, a comparatively small amount of a metal salt compound is applied in the film overall. An effect of improving moisture sensitivity of a film for glass lamination can be obtained through this.

According to another embodiment of the present disclosure, laminated glass comprises a laminate comprising a film for laminated glass described above between two pieces of glass.

In detail, the laminated glass 100 comprises a first glass substrate 120; a second glass substrate 130 opposite to the first glass substrate; and a film for glass lamination 110 interposed between the first glass substrate 120 and the second glass substrate 130 to be bonded to the first glass substrate 120 and the second glass substrate 130.

The film for glass lamination 110 comprises a polyvinyl acetal resin, a plasticizer, a metal salt or a metal ion, and satisfies below Equation 1.

$$\left| \frac{M2 - M1}{D2 - D1} \right| > \left| \frac{M4 - M3}{D4 - D3} \right| \qquad \text{[Equation 1]}$$

Detailed description on Equation 1 and contents related to the same is overlapped with the above description, and thus the further description is omitted.

The two pieces of glass are described as glass in the present application, but any light transmission panel is applicable, and a material such as plastic may be applied.

Descriptions on the detailed structure, composition, characteristics, method of manufacture, and so on are overlapped with the above description, and thus further description is omitted.

The laminated glass may have an average whitening occurrence distance of 5 mm or less, 0 to 5 mm, or 0.1 to 5 mm measured by keeping a sample having an area of 100 mm×100 mm for two weeks in an isothermal-iso humidity chamber at 65° C. and 95% rh. Such an average whitening occurrence distance means having a considerably excellent moisture resistance even in a condition of high temperature and humidity.

The laminated glass may have a yellow index variation of 2.5 or less between before and after being kept for two weeks in an isothermal-iso humidity chamber at 65° C. and 95% rh. This results in the laminated glass having excellent long-term durability. It may be evaluated as a more excellent result in a film simultaneously comprising a benzotriazole-based compound and a metal salt.

The pummel adhesion grade of the laminated glass may be grade 3 or 4. This is a proper range of adhesion between a glass and a film and means having sufficient adhesion for serving as a safety glass.

Hereinafter, the present disclosure will be described in further detail by specific embodiments. The below embodiments are for illustration only and the scope of the present application is not limited thereto.

1. Preparation of Materials

1) Preparation of Additive Compositions

Irganox 1010 as an antioxidant of 0.15 wt % based on the entire film, Tinuvin P as a UV absorber of 0.3 wt %, magnesium (MG) acetate as a metal salt adhesion regulator of 0.18 wt %, were mixed, thereby manufacturing additive composition 1.

Additive composition 2 was manufactured by manufacturing as the same as the additive composition 1, excepting for applying magnesium (MG) acetate in an amount of 1.25 wt %.

2) Preparation of Polyvinyl Butyral Resin (A)

A polyvinyl acetal resin having a polymerization of 1700 and saponification of 99 and n-butanal were put into a reactor to allow a general synthesis process of a polyvinyl butyral resin to proceed. Thereby a polyvinyl butyral resin having a hydroxyl group of 19.5 wt %, a butyral group of 79.8 wt %, and an acetyl of 0.7 wt % was obtained.

2. Preparation of a Polyvinyl Butyral Film

1) Setting for Manufacture of a Film of Examples

A device in a specific form with tungsten wires available from VWF INDUSTRIES equipped in die lip parts was applied to regulate the ion density of a film's surface.

Both ends of the tungsten wires are connected to an electric generator so that it is possible to apply voltage to the tungsten wires. The characteristics of (+) or (−) can be given to the wires depending on the mode of the electric generator by selecting POSITIVE or NEGATIVE. In the present disclosure, a NEGATIVE mode was selected and used to control the density distribution of metal ions in Examples (refer to FIG. 1).

2) Preparation of a Film of Example 1

Polyvinyl butyral resin (A) of 72. 37 wt %, 3G8 as a plasticizer of 27 wt %, and additive composition 1 of 0.63 wt % were put into a twin-screw extruder, and melt-extruded to manufacture a film form with a total thickness of 780 μm at a rate of 10 M per minute through a T-die set in the above. At this time, the applied electric current was 5 kV.

2) Preparation of a Film of Example 2

The film of Example 2 was manufactured by the same method as the film of Example 1 except for applying an applied voltage lowered to 4.5 kV.

3. Property Evaluation of Polyvinyl Butyral Films

1) Preparation of Samples for Durability/Moisture Resistance Evaluation

Films of Examples 1 and 2 were kept for a week at 20° C. and 30% RH, and then cut into a size of 100 mm×100 mm (width×length). Two pieces of clear glass of 2.1 T (mm, same as below) were placed at both sides thereof so that pre-laminating of the films having a laminated structure of 2.1 T glass—film—2.1 T glass was performed for 20 seconds in a vacuum laminator at 120° C. and 1 atmospheric pressure.

Thereafter, the main laminating of the laminates of glass—film—glass that was pre-laminated was performed, thereby obtaining laminated glass samples. Heating time for 25 minutes from room temperature to 140° C. and maintaining time for 25 minutes at 140° C. were applied as the condition of main laminating.

2) Durability Evaluation: A Method of Evaluating Yellow index Variation (d-YI)

Initial values of the yellow index ($YI_{initial}$) at the center of the laminated glass samples manufactured in the above were measured using Ultra Scan Pro available from HUNTER-LAB in the condition of D65 and 10° C. according to ASTM E313 standard. Samples whose initial values of the yellow index had been measured were kept for two weeks in an isothermal-iso humidity chamber chamber at 65° C. and 95% rh, taken out and measured again by the same method as the above for measuring final values of yellow index ($YI_{final}$), so that the difference of yellow index was calculated by following Equation 2.

$$d\text{-}YI = YI_{final} - YI_{initial} \quad \text{[Equation 2]}$$

When a value obtained by Equation 2 was 2.5 or less, it was evaluated as Pass, and when a value obtained by Equation 2 was more than 2.5, it was evaluated as Fail.

3) Moisture Resistance Evaluation: Measurement for Whitening Occurrence Distance The laminated glass samples 100 manufactured in the above were kept for two weeks in an isothermal-iso humidity chamber at 65° C. and 95% rh and taken out for checking a part (the area where a whitening phenomenon occurred) where haze occurred from the center of four sides thereof with the naked eye, so that the distance was measured with a ruler (refer to FIG. 2). The average value of four sides was calculated according to below Equation 3, shown as a whitening occurrence distance (mm).

$$\text{Average Whitening Occurrence Distance} = (d1+d2+d3+d4) \div 4 \quad \text{[Equation 3]}$$

In Equation 3, the distances where a whitening phenomenon occurred were measured at the center of the first to fourth sides are respectively referred to as d1 to d4 (mm as the unit).

When the average whitening occurrence distance is 5 mm or less, it was evaluated as Pass. When the average whitening occurrence distance is more than 5 mm, it was evaluated as Fail.

4) Pummel Adhesion Evaluation

Adhesion between a polyvinyl acetal film and glass was evaluated through pummel adhesion evaluation. In detail, PVB films manufactured in Examples 1 to 2 were kept for a week at 20° C. and 30% RH, and then two pieces of clear glass of 2.1 T were placed on both sides thereof thereby manufacturing laminated structures of 2.1 T glass—film—2.1 T glass of 100 mm×150 mm (width×length). The laminated structures were pre-laminated for 20 seconds in a vacuum laminator at 150° C. and 1 atmospheric pressure. After that, the main laminating of the pre-laminated laminated structures was performed for a heating time of 25 minutes from room temperature to 140° C., and maintaining the time for 25 minutes at 140° C. to obtain samples in a laminated glass form.

The samples in a laminated glass form were refrigerated for 4 hours at −20° C., and then hit with a hammer in succession, so that degrees of the amounts of glass remaining in the films were measured. Depending on the amount of remaining glass bonded to glass after hitting, a case in which all glass was removed was sorted as grade 0, and a case in which all glass remained was sorted as grade 8, so that the values from grade 0 to grade 8 were decided and when the pummel grade is between 3 and 4, it was indicated as Pass, and when the pummel grade is more than 5 or 2 or below, it was indicated as Fail.

5) Evaluation of Surface Ion Density

A secondary ion mass spectrometer (TOF SIMS) that can measure surface ions' strength is used to check the surface ion density of the films. First, the pre-treating process of removing surface roughness in the manufactured films proceeded to increase the accuracy of the analysis. Flattening a pattern of the surface by treating with heat for 3 minutes in a vacuum laminator in the condition of 1 atmospheric pressure at 150° C. and after that removing heat by keeping for one hour at 20° C. and 30 RH were performed as the method of pre-treating.

The pre-treated films were equipped in a sample holder after sampling in a size of 10 mm×10 mm (width×length), and the measurement was performed. The thickness of the cut surface was set to be 1 nm during sputtering once at TOF-SIMS, and then sputtering and measurement of about 160 times were repeated, thereby obtaining data to a depth of 160 nm, for using them to perform ion density analysis depending on the depth. For a more accurate comparison, data to 5 nm were excepted from the average to remove noise generated by surface foreign matter.

A graph showing the result of evaluating the measured surface ion density was shown in FIG. 4. In FIG. 4, #1 is Example 1, #2 is Example 2, the horizontal axis is depth (nm), and the vertical axis is intensity (counts).

When the surface outermost angle is set to be 0, measured values from 6 nm to 150 nm were evaluated, and the values in a range of 6 to 125 nm, which had large density variation depending on depth, were calculated for obtaining gradient of variation by unit of 40 and the average, so that these values were shown in below Table 1. Values according to Equation 1 and other measured values were shown in below Table 2.

TABLE 1

| Gradient by unit of 40 nm (Absolute Value)* | Section 1 (6~45 nm) | Section 2 (46~85 nm) | Section 3 (86~125 nm) |
|---|---|---|---|
| Example 1 | 1.58 | 0.40 | 0.03 |
| Example 2 | 2.31 | 0.30 | 0.05 |
| Average Value by unit of 40 nm** | Section 1 (6~45 nm) | Section 2 (46~85 nm) | Section 3 (86~125 nm) |
| Example 1 | 56.04 | 18.06 | 12.26 |
| Example 2 | 44.34 | 12.21 | 11.25 |

TABLE 2

| | | Example 1 | Example 2 |
|---|---|---|---|
| Input of Metal Slat (ppm) | mg Acetate | 33 | 33 |
| Applied Voltage | | 5 KV | 4.5 KV |
| Whether the Values of Equation 1 is Satisfied (D1: 5 nm, D2: 55 nm, D3: 90 nm, D4: 140 nm) | | 1.37 > 0.26 (Satisfied) | 1.65 > 0.08 (Satisfied) |
| Evaluation | Pummel Adhesion | Pass | Pass |
| | Moisture Resistance | Pass | Pass |
| | Durability | Pass | Pass |

In Tables 1 and 2, films of Examples 1 and 2 manufactured by applying voltage could be verified as having a considerably high density of magnesium (Mg) ions derived from a metal salt in the surface. Furthermore, it could be verified that the thickness of the density gradient of metal ions in Example 1 was shown as being deeper than the case of Example 2. Additionally, these characteristics can be verified more definitively if the surface ion density gradient of Equation 1, which is evaluated based on about 50 nm, is observed.

Examples 1 and 2 were shown as Pass, shown as having a good adhesion regulation effect in the case of a pummel adhesion. Examples 1 and 2 had excellent moisture resistance and durability, too, verified as satisfying three characteristic conditions difficult to obtain simultaneously.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A film for glass lamination comprising:
   a metal salt or a metal ion,
   wherein a first absolute value in a gradient of concentration of metal ions within a depth of 6 to 45 nm from a surface of the film is greater than a second absolute value in the gradient of the concentration of the metal ions within a depth of 86 to 125 nm from the surface,
   wherein a first average value of the concentration of the metal ions within the depth of 6 to 45 nm is 2.5 times or more than a second average value of the concentration of the metal ions within the depth of 86 to 125 nm.

2. The film of claim 1, wherein a third absolute value in the gradient of the concentration of the metal ions within a depth of 46 to 85 nm from the surface of the film is greater than the second absolute value.

3. The film of claim 1, wherein a third average value of the concentration of the metal ions within a depth of 46 to 85 nm from the surface of the film is greater than the second average value.

4. The film of claim 1, wherein a yellow index variation value of the film is 2.5 or less during, before, and after being kept in an isothermal-iso humidity chamber of 65° C. and 95% rh for two weeks.

5. A film for glass lamination comprising:
   a polyvinyl acetal resin, a plasticizer, and a metal salt or a metal ion,
   wherein a first average value of concentration of metal ions within a depth of 6 to 45 nm from a surface of the film is 2.5 times or more than a second average value of the concentration of the metal ions within a depth of 86 to 125 nm from the surface, and
   the film satisfy Equation 1:

$$\left|\frac{M2-M1}{D2-D1}\right| > \left|\frac{M4-M3}{D4-D3}\right|,$$

where M1 is an amount of metal ions at a first depth (D1) from the surface, M2 is an amount of metal ions at a second depth (D2), M3 is an amount of metal ions at a third depth (D3), and M4 is an amount of metal ions at a fourth depth (D4), and the D1 and D2 are respectively 60 nm or less, and the D3 and D4 are respectively 80 nm or more.

6. The film of claim 5, wherein the D1 is 0.1 nm to 15 nm, the D2 is 40 nm to 55 nm, the D3 is 80 nm to 95 nm, and the D4 is 135 nm to 150 nm.

7. The film of claim 6, wherein a difference between the D2 and the D1 corresponds to a difference between the D4 and the D3.

8. The film of claim 5, wherein the D1 is 5 nm, the D2 is 55 nm, the D3 is 90 nm, and the D4 is 140 nm.

9. The film of claim 5, wherein the M1 is three times or more of the M3.

10. The film of claim 6, wherein the M1 is three times or more of the M3.

11. The film of claim 7, wherein the M1 is three times or more of the M3.

12. The film of claim 8, wherein the M1 is three times or more of the M3.

13. A laminated glass comprising:
a first glass substrate;
a second glass substrate disposed opposite to the first glass substrate; and
a glass lamination film interposed between, and bonding, the first glass substrate and the second glass substrate,
wherein the glass lamination film comprises a polyvinyl acetal resin, a plasticizer, and a metal salt or a metal ion,
wherein a first average value of concentration of metal ions within a depth of 6 to 45 nm from a surface of the glass lamination film is 2.5 times or more than a second average value of the concentration of the metal ions within a depth of 86 to 125 nm from the surface, and
the glass lamination film satisfies Equation 1:

$$\left|\frac{M2-M1}{D2-D1}\right| > \left|\frac{M4-M3}{D4-D3}\right|,$$

where M1 is an amount of metal ions at a first depth (D1) from the surface, M2 is an amount of metal ions at a second depth (D2), M3 is an amount of metal ions at a third depth (D3), and M4 is an amount of metal ions at a fourth depth (D4), and the D1 and D2 are respectively 60 nm or less, and the D3 and D4 are respectively 80 nm or more.

* * * * *